United States Patent
Svendsen et al.

(10) Patent No.: US 7,970,854 B2
(45) Date of Patent: Jun. 28, 2011

(54) METHOD AND SYSTEM FOR REQUESTING IMAGE PRINTS IN AN ONLINE PHOTOSHARING SYSTEM

(75) Inventors: Hugh Blake Svendsen, Cary, NC (US); Robert P. Morris, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1834 days.

(21) Appl. No.: 10/346,298

(22) Filed: Jan. 15, 2003

(65) Prior Publication Data

US 2004/0139172 A1    Jul. 15, 2004

(51) Int. Cl.
*G06F 15/16* (2006.01)
(52) U.S. Cl. .......... 709/217; 709/205
(58) Field of Classification Search .......... 709/217–219, 709/201, 205; 707/10; 705/1, 26; 358/1.15
See application file for complete search history.

(56) References Cited

U.S. PATENT DOCUMENTS

| | | | |
|---|---|---|---|
| 6,324,521 B1 * | 11/2001 | Shiota et al. | 705/27 |
| 6,577,311 B1 * | 6/2003 | Crosby et al. | 345/428 |
| 6,583,799 B1 * | 6/2003 | Manolis et al. | 715/838 |
| 6,636,854 B2 * | 10/2003 | Dutta et al. | 707/10 |
| 6,675,205 B2 * | 1/2004 | Meadway et al. | 709/219 |
| 6,742,023 B1 | 5/2004 | Fanning et al. | |
| 6,757,684 B2 * | 6/2004 | Svendsen et al. | 707/10 |
| 6,791,702 B2 * | 9/2004 | Tanaka | 358/1.13 |
| 6,813,618 B1 * | 11/2004 | Loui et al. | 707/5 |
| 6,870,547 B1 | 3/2005 | Crosby et al. | |
| 6,904,185 B1 | 6/2005 | Wilkins et al. | |
| 6,938,042 B2 * | 8/2005 | Aboulhosn et al. | 707/10 |
| 6,954,543 B2 * | 10/2005 | Svendsen et al. | 382/102 |
| 7,194,679 B1 | 3/2007 | Green | |
| 2001/0050684 A1 | 12/2001 | Smith | |
| 2002/0065844 A1 | 5/2002 | Robinson et al. | |
| 2002/0073075 A1 | 6/2002 | Dutta et al. | |
| 2002/0093678 A1 * | 7/2002 | Skidgel et al. | 358/1.15 |
| 2002/0103813 A1 | 8/2002 | Frigon | |

(Continued)

FOREIGN PATENT DOCUMENTS

WO    WO00/11871    3/2000

(Continued)

OTHER PUBLICATIONS

Baker, Loren, Flickr Photo Sharing Service Acquired by Yahoo,: Editor, Mar. 21, 2005, 2 pages.

(Continued)

*Primary Examiner* — Salad Abdullahi
(74) *Attorney, Agent, or Firm* — Withrow & Terranova, PLLC

(57) ABSTRACT

A method and system for requesting prints of digital images displayed online is disclosed. The present invention provides a network-based photosharing system that includes a plurality of peer nodes that contain images and that are capable of communicating with other peer nodes. The method and system include allowing a user of a first one of the peer nodes to invite at least one visitor to view images hosted on the first peer node, and allowing the visitor to browse the images on the first peer node and to select one or more images to print by filling-out a print request form that identifies only the visitor and the selected images. The method and system further include notifying the user of the submission of the print request form, wherein once notified, the user accesses the print request form, prints the selected images, and delivers the prints to the visitor.

18 Claims, 4 Drawing Sheets

U.S. PATENT DOCUMENTS

| | | | |
|---|---|---|---|
| 2002/0112001 A1 | 8/2002 | Sutherland et al. | |
| 2002/0120757 A1 | 8/2002 | Sutherland et al. | |
| 2002/0186402 A1* | 12/2002 | Jackson et al. | 358/1.15 |
| 2003/0028617 A1 | 2/2003 | Taylor | |
| 2003/0058275 A1 | 3/2003 | Pilu et al. | |
| 2003/0063770 A1 | 4/2003 | Svendsen et al. | |
| 2003/0097410 A1 | 5/2003 | Atkins et al. | |
| 2003/0117642 A1 | 6/2003 | Haraguchi | |
| 2003/0131002 A1 | 7/2003 | Gennetten et al. | |
| 2003/0187673 A1* | 10/2003 | Needham et al. | 705/1 |
| 2003/0236831 A1 | 12/2003 | Ortiz et al. | |
| 2003/0236832 A1* | 12/2003 | McIntyre et al. | 709/204 |
| 2004/0046868 A1* | 3/2004 | Anderson et al. | 348/207.11 |
| 2004/0070678 A1* | 4/2004 | Toyama et al. | 348/231.3 |
| 2004/0109197 A1 | 6/2004 | Gardaz et al. | |
| 2004/0133589 A1 | 7/2004 | Kiessig et al. | |
| 2004/0201709 A1* | 10/2004 | McIntyre et al. | 348/211.2 |
| 2004/0215625 A1 | 10/2004 | Svendsen et al. | |
| 2005/0033806 A1* | 2/2005 | Harvey et al. | 709/204 |
| 2005/0044147 A1 | 2/2005 | Yap | |
| 2005/0190273 A1* | 9/2005 | Toyama et al. | 348/231.5 |
| 2006/0044599 A1* | 3/2006 | Lipowitz et al. | 358/1.15 |

FOREIGN PATENT DOCUMENTS

WO     WO02/08926 A1     1/2002

OTHER PUBLICATIONS

Vroegindewejj, Sander, "My Pictures: Informal Image Collection," Information Infrastructure Laboratory, HP Laboratories, Nov. 5, 2003, pp. 1-85.

* cited by examiner

METHOD AND SYSTEM FOR REQUESTING IMAGE PRINTS IN AN ONLINE PHOTOSHARING SYSTEM

FIELD OF THE INVENTION

The present invention relates to electronic storage and sharing of digital images, and more particularly to a method and system for requesting image prints in an online photosharing system.

BACKGROUND OF THE INVENTION

Over the past several years, photosharing has become widely accepted by photo enthusiasts. Many websites currently exist that allow users to upload digital images to the site for storage on a server and for viewing by others over the Internet. To share photos, users must first register on a photosharing website, and create an image album in which to store their images. The user typically selects a theme for the image album and selects one or more images to upload to the site from their PC. The images are then uploaded to a server for storage and associated with the selected album. After creating the image album, the user may optionally rename and/or edit each photo.

The user may then notify others of the album using one of two methods. In the first method, the user sets preferences for the album specifying what users have permission to view the album, and personally informs each person of the web address of the album. In the second and more common method, the user types-in the e-mail addresses of each person the user wants to view the album and the photosharing site automatically sends an e-mail inviting recipients to view the album by clicking on the enclosed URL.

Although the current approach to photosharing works for its intended purpose, there are some areas where the traditional server centric photosharing falls short. For example, users attempting to post images on the site face difficulties in uploading images and organizing the images once on the site. In addition, some users dislike the notion of posting their personal pictures on a public website, even if users are given the option of designating their albums as "private". Due to these difficulties, users predominantly store the majority of their images on their local PC, and upload only those images that they really wish to share with others. In addition to the problems imposed on users who wish to share images, conventional photosharing sites also impose problems on visitors of the site who wish to view the shared images.

For example, traditional photosharing sites also have a mechanism by which visitors of the site can select images for printing, typically for fee. After selecting the desired pictures to print, the visitor must typically fill-out contact information, including name, shipping address, and credit card information. The site hosting the images or a third party vendor then processes the prints and mails them to the requester via U.S. mail. There are several disadvantages to this process. One disadvantage is that visitors have limited options obtaining prints in any other way. Many sites, for instance, don't provide visitors to high-resolution versions of the images, so visitors can't personally make their prints. Consequently, visitors must pay for the prints. Another disadvantage is that visitors are forced to divulge personal information to websites, exposing themselves to spam email and possible credit card theft.

Accordingly, what is needed is an improved method and system for requesting image prints in an online photosharing system. The present invention addresses such a need.

SUMMARY

The present invention is a method and system for requesting prints of digital images displayed online. The present invention provides a network-based photosharing system that includes a plurality of peer nodes that contain images and that are capable of communicating with other peer nodes. The method and system include allowing a user of a first one of the peer nodes to invite at least one visitor to view images hosted on the first peer node, and allowing the visitor to browse the images on the first peer node and to select one or more images to print by filling-out a print request form that identifies only the visitor and the selected images. The method and system further include notifying the user of the submission of the print request form, wherein once notified, the user accesses the print request form, prints the selected images, and delivers the prints to the visitor.

According to the method and system disclosed herein, the network-based photosharing architecture enables the visitor to view images and request prints directly from the person hosting the images, rather than going through a third party vendor. In addition, the visitor does not have to pay for the prints or provide personal information, such as address and credit card.

DETAILED DESCRIPTION OF THE INVENTION

The present invention relates to a method and system for providing printing images from a network-based, peer-to-peer photosharing service. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides an improved method and system for requesting prints from an online photosharing service. In a preferred embodiment, the present invention provides a web-based, peer-to-peer photosharing service in which all workstations and computers in the network store their own images and act as servers to other users on the network. Users invite visitors to view images directly on the user's computer and to make print requests directly from that user without divulging private information or making a payment.

Figure 1:
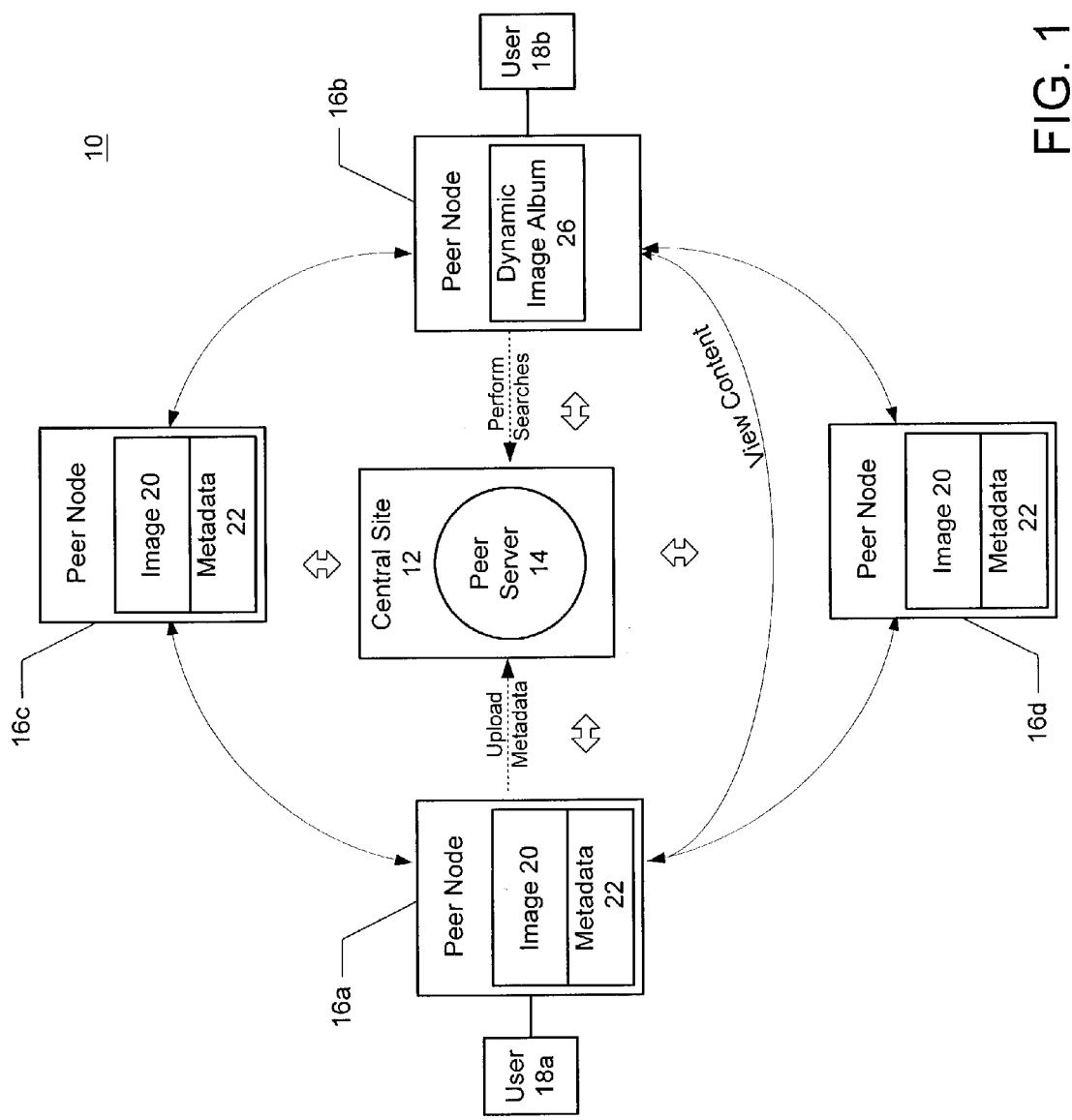
FIG. 1 is a block diagram illustrating a network-based photosharing system in accordance with a preferred embodiment of the present invention.

FIG. 1 is a block diagram illustrating a peer-to-peer (P2P) photosharing system in accordance with a preferred embodiment of the present invention. According to the present invention, the system 10 includes a central photosharing website 12 that includes a peer server 14, and multiple peer nodes 16a-16d (collectively referred to as peer nodes 16). The peer server 14 and each of the peer nodes 16 are capable of communicating with one another over a network, such as the Internet. In a preferred embodiment, users 18 may also access the central site 12 from devices or clients (not shown) that are not peer nodes 16, using a standard web browser.

In a preferred embodiment, the peer nodes 16 may each represent either a website or a computer, and typically store the digital images 20 of a particular user 18. A peer node may store the images of more than one user. For example, two family members which share a home PC, but manage their images separately may maintain separate accounts with the system 10 on the shared PC. The digital images 20 are stored as image files that include image data. Each image also has metadata 22 associated with it that describe and categorize the image. The metadata 22 may be associated with the images 20 by the user 18 or automatically by the peer node 16 as described below. In addition some or all of the metadata 22 may be associated with the image by a digital camera at the time of image capture. Each image 20 may also be associated with a particular type of metadata, which is a smaller representation of the image data, called a thumbnail image.

The photosharing system 10 is in contrast to the traditional photosharing model where the user 18 would post digital images by uploading the images from his or her computer to a webserver for storage in a static album. Instead, in the photosharing system 10, the peer nodes 16 maintain storage of the actual image data and only the metadata 22 (and, in particular, the thumbnail image) for each image is uploaded to the peer server 14.

In operation, users 18 of the peer nodes 16 register themselves and their peer nodes 16 with the peer server 14 to become members of the service so that other users 18 can search for and view their images 20. The user 18 may share images 20 that are local on the user's peer node 16 with the photosharing site 12 by uploading the image metadata 22, which synchronizes the peer node 16 and the peer server 14. The peer server 14 maintains a list of users 18, a list of groups to which users may belong, and peer nodes 16, and provides a search engine and a cache of the metadata for each shared image.

Figure 2:
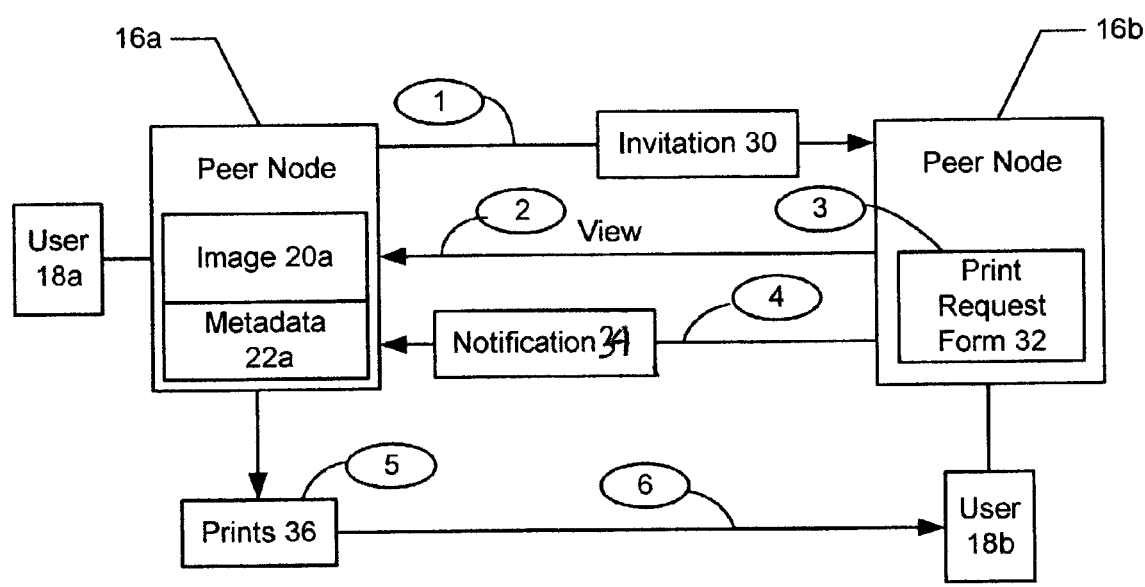
FIG. 2 is a flow diagram illustrating the process for requesting prints using the photosharing system 10 in accordance with a preferred embodiment of the present invention.

FIG. 2 is a flow diagram illustrating the process for requesting prints using the photosharing system 10 in accordance with a preferred embodiment of the present invention. The process begins with step (1) when a user 18a sends an invitation 30 to at least one person inviting him or her to view the images 20 hosted on the user's 18a peer node 16a. The invited person (e.g., visiting user 18b) is preferably someone known personally by the user, such as a family member, relative, or friend. The invited person may or may not be a registered user of the system 10. Preferably, the user 18a sends the invitation via email with a link (e.g., a URL) to the location of the images. However, the user 18a may also extend the invitation verbally.

In step (2), the visiting user 18b browses the images 20 on the first peer node 16a and selects one or more images 20 to print. The visiting user 18b preferably accesses the images 20 by directing a web browser to the specified URL. If the visiting user 18b is a member of the system 10, then the visiting user 18b may also access the images 20 through his or her peer node software.

After forming a collection of images, the visiting user 18b fills-out a print request form in step (3). In a preferred embodiment, the visiting user 18b clicks a check box next to the desired images and then clicks a "Request Prints" button. In response, a Print Request form 32 is displayed listing or showing the selected images. The user then provides his or her name and the number of prints desired. If the user is a registered user, his/her name is already known to the peer node. At a minimum, the print request form 32 should identify the visiting user 18b by name, the images to print, and the quantity of prints. In other embodiments, the user may select other criteria such as the size of the prints, and/or order other items bearing the images, such as CD's, mugs, and calendars for instance. In a preferred embodiment, the information gathered from the print request form 32 is stored as a standard Digital Print Order Format (DPOF) document.

After the print request form 32 is completed, a notification 34 of the print request form is sent to the user 18b in step (4). In the embodiment where the visiting user 18b accesses the images 20 through a web browser, the user's peer node 16a displays the print request form 32 in HTML on the visiting user's computer, and the completed form is stored on the peer node 16a. In this case, the peer node 16a also displays the notification 34 to the user 18a after the form 32 is completed. In the embodiment where the visiting user 18b accesses the images 20 through his own peer node 18b, the print request form may be stored on the visiting user's peer node 18b. In this case, the peer node 16b of the person requesting the prints (the visiting user) can either send the print request form 32 along with the notification 34 to the hosting user's peer node 16a, or the peer node 18b can just send the notification 34 and allow the user's peer node 16a to retrieve the print request form 32.

In response to the notification 32, the user 18a accesses the print request form 32 and makes prints 36 of the identified images 20 in step (5). In an alternative embodiment, the user 18a may forward the print request form 32 to a third party vendor to have the prints 36 made. After the prints 36 are made, the prints 36 are delivered to the visiting user 18b in step (6).

According to the present invention, the visitor 18b is able to request prints directly from the person hosting the images, rather than going through a third party vendor. In addition, the visiting user 18b is not required to pay for the prints 36 or provide personal information, such as address and credit card (assuming the hosting user knows the visiting user's address already, or can deliver the prints through some other means).

Users 18 may dynamically create image albums 26 for viewing the images 20 by submitting search criteria that are based on metadata 22. In FIG. 1 for example, user 18a has shared images 20 on the central site 12 by uploading the metadata 22 to the peer server 14. User 18b may then submit a search to the peer server 14 to view images 20 that match the search criteria.

In response to receiving the search terms, the peer server 14 returns a list of image locators (e.g., URLs) for images 20 matching the search criteria to peer node 16b. The user 18b then selects entries on the list corresponding to the images 20, which will be displayed in an online album 26. In a preferred embodiment, the user 18b is shown a list of thumbnail images with some subset of metadata 22 which identifies the image and/or its source, rather than a list of image names. In an alternative embodiment, peer node 16b may display the list of peer nodes 16 with matching images before retrieving any image data and/or additional metadata, and allow the user to select which peer nodes 16 to use in composing the album.

Figure 3:
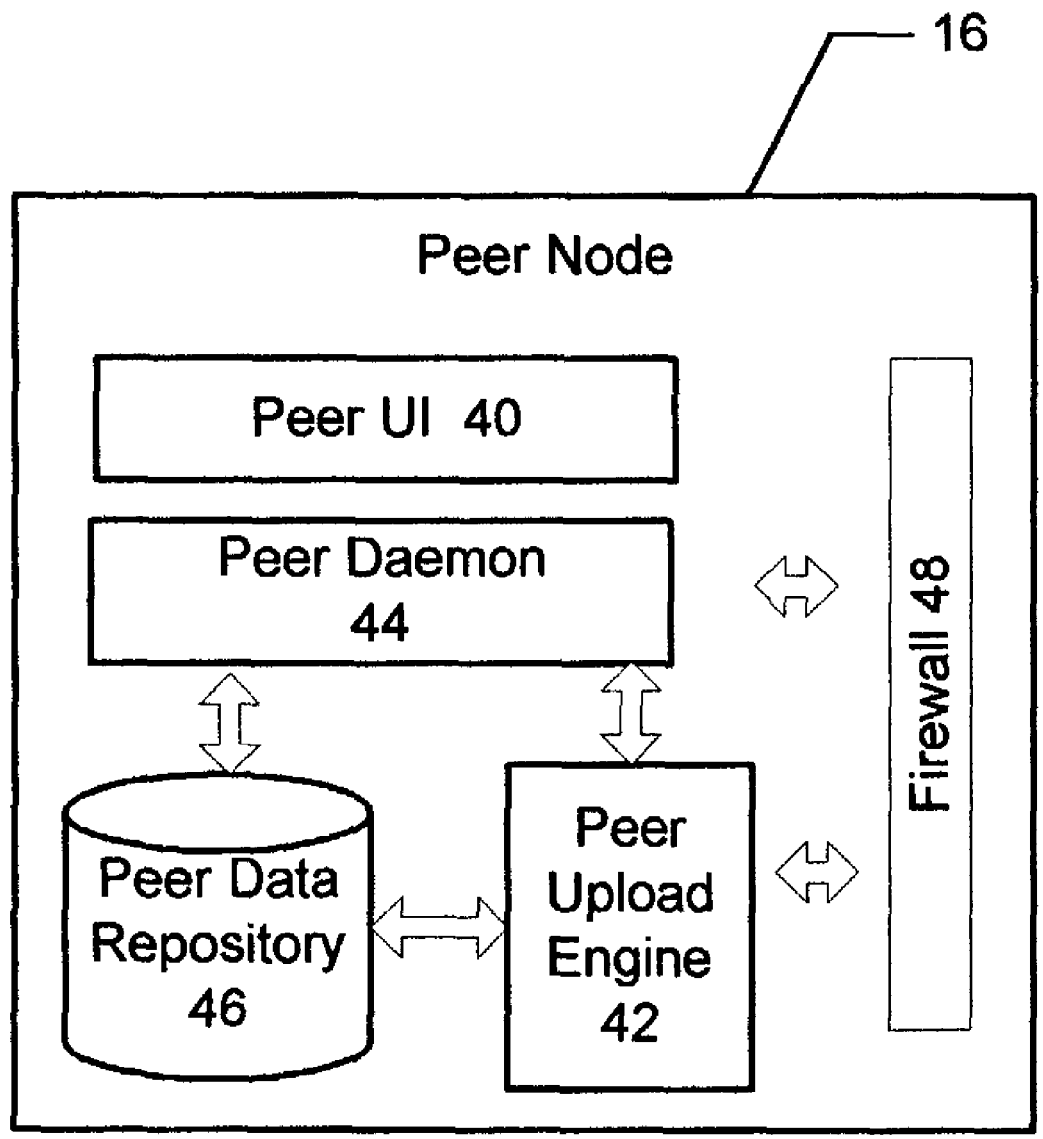
FIG. 3 is a block diagram illustrating the peer node application software.

FIG. 3 is a block diagram illustrating the peer node 16 application software. In a preferred embodiment, a peer node 16 application software includes a peer user interface (UI) 40, a peer upload automation engine 42, a peer daemon 44, and a peer data repository 46. The peer node 16 may also include an optional firewall 48 or access the Internet through a firewall located in another device.

The peer UI 40 is a graphical user interface application that allows the user 18 to view and edit data. The data in most cases is images 20 and associated metadata 22, which may reside on both the peer node 16 or on remote peer nodes 16. The peer UI 40 is also responsible for displaying the print request form to users 18b for completion when prints are desired. The peer UI 40 may be implemented in a number of different ways, in a preferred embodiment the peer UI 40 is implemented as a web browser but alternately it may be an application specifically designed for the system 10.

According to another aspect of the present invention, the peer daemon 44 automatically assigns metadata 22 to the images 20 prior to the metadata upload process. The peer daemon 44 makes intelligent guesses at how to fill-in the metadata values 22 using defaults specified by the metadata schemas. In addition, the peer daemon 44 is trained over time based on the user's past behavior. The peer daemon 44 then makes use of the peer upload automation engine 42 to send the metadata 22 associated with the images to the peer server 14. The metadata facilities of the peer daemon 44 and peer upload engine 42 allow a user 18 to categorize and upload the metadata 22 for a very large number of images 20 to the peer server 14 with ease. The peer daemon 44 also allows the user 18, to make simple edits to the pictures before the images 20 are stored and the metadata 22 is uploaded (rotation for example).

The peer daemon 44 includes a background process that scans the peer node 16 computer for images 20 that are to be shared, and catalogs metadata about images 20. The peer daemon 44 uses the peer data repository 46 to store images 20 and local copies of the metadata 22. In a preferred embodiment the peer daemon 44 acts as a web server to present the peer UI 40 to the user through a web browser. The peer daemon 44 communicates with the peer server 12 as needed to retrieve presentation components as needed, thus distributing the presentation logic of the system. In a similar manner, the peer daemon 44 may also offload other work from the peer server 14 that is typically the sole responsibility of a central server or site in a traditional photosharing server. Examples of such work activities, include caching and processing of security information, receiving and routing events, acting as a peer proxy 68 for other peer nodes (see description of FIG. 4), and caching user and group account information.

Figure 4:
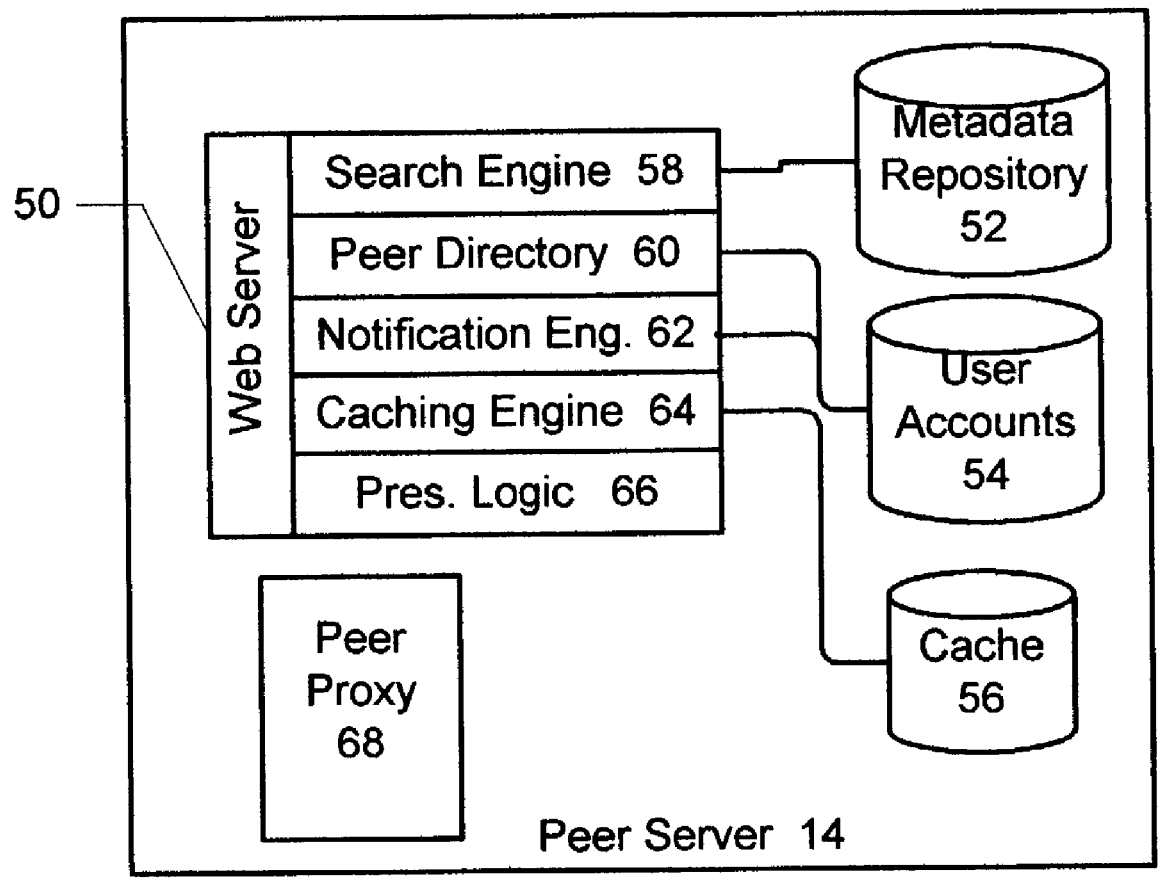
FIG. 4 is a block diagram illustrating the contents of the central site peer server.

FIG. 4 is a block diagram illustrating the contents of the central site peer server 14. In a preferred embodiment, the peer server 14 includes a web server application 50, a metadata repository 52, a user and group account database 54, a cache 56, and a peer proxy 68.

The web server application 50 serves pages formatted to suit the capabilities of the client device so that a standard web browser can be used to view the data returned by the web server. The metadata repository 52 is a database that stores metadata definitions and the metadata 22 uploaded from peer nodes 16 associated with specific images and groups of images 22 associated with images 20 stored on the peer nodes 16. In a preferred embodiment, the metadata definitions are specified using the W3C Resource Definition Framework (RDF) standard. In this preferred embodiment a core metadata schema/vocabulary is defined, which is associated with all images. Groups and users may specify their own metadata 22 vocabularies and may share these vocabularies with other users and groups. Users and group administrators may specify one or more vocabularies, which must be supported for images associated with the user and group accounts, respectively. The peer server 14 and peer nodes 16 enforce these metadata requirements.

The user account database 54 stores user account and corresponding contact information and preferences of each registered user 18. Groups of users may also share common policies, which may include permission settings, UI options, required and optional metadata vocabularies, subscriptions lists, event/notification policies, and caching policies.

The cache 56 is used to store the metadata 22 associated with frequently accessed images 20 to provide for quicker searches. The metadata 22 may be automatically replaced in the cache 56 with the metadata 22 from other images 20 based on the peer server's configured caching policies. The peer proxy 68 allows the peer nodes 16 behind firewalls 48 to connect with peer server 14. Once this connection is established other peer nodes 16 may contact the associated peer node 16 behind a firewall 48 by connecting to the peer proxy which will route requests to the peer node behind the firewall and will route responses to the associated node making the request.

The peer server 14 further includes a search engine 58, a peer directory 60, an event/notification engine 62, a caching engine 64, and presentation logic and resources 66. The search engine 58 takes requests received by various peer nodes 16 and searches through the metadata 22 stored in the metadata repository 52. The search engine 58 also has the capability of offloading searches by passing the search criteria to one or more of the peer nodes 16 to search the metadata 22 stored on the peer node(s) 16. In a preferred embodiment, the peer site offloads searches to peer nodes 16 with large amounts of metadata 22. An example of such a peer node 16, is a peer node 16 which is also a traditional centralized photosharing site.

The peer directory 60 maintains a list of active peer nodes 16 and associates the peer nodes 16 with registered users 18 from the user account database 54. The notification engine 62 is responsible for notifying peer nodes 16 when predefined events occur. Examples of predefined events include other peer nodes 16 becoming active, particular images 20 being posted on the peer server 14, or a request being filled. The caching engine 64 interfaces with the cache 56 and is responsible for determining what data to cache, where to cache it, and how long to hold the data.

The presentation logic 66 composes the user interface for user interaction with the peer site. The presentation 66 logic also provides templates and presentation resources (e.g., icons, graphics) used by the peer nodes in composing user interface elements. The presentation logic 66 adapts the presentation based on the capabilities of the requesting device and user 18 preferences. The peer server 14 may also provide the peer nodes 16 access to external service providers (not shown), which may include print fulfillment providers, or services that burn image albums 26 on CDs or prints real album pages, for instance.

A peer-to-peer photosharing service has been disclosed that allows users to maintain storage of images on their peer nodes and to respond to print requests from visitors browsing those images, eliminating the need for third party printing and payment. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for requesting prints of digital images displayed online, the method comprising:
    creating a network-based photosharing system comprising a plurality of peer nodes that contain images and that are capable of communicating with other peer nodes;
    allowing a user of a first peer node to invite at least one visitor to view images hosted on the first peer node;
    allowing the visitor to browse the images on the first peer node and to select one or more images to print by filling out a print request form that identifies the visitor and selected images; and
    notifying the user that the visitor has inserted information on the print request form, wherein the user, rather than a third party vendor, accesses the print request form, prints the selected images, and delivers the prints to the visitor.

2. The method of claim 1 wherein the print request form requires the name of the visitor, specifies which images to print, and specifies a quantity of prints.

3. The method of claim 1, wherein the print request form is in Digital Print Order Format (DPOF).

4. The method of claim 3 wherein the visitor is personally known by the user and is not required to supply personal information about the visitor.

5. The method of claim 1 wherein the visitor is invited by sending an email with a URL to a location of the images.

6. The method of claim 5 wherein the visitor access the images by directing a web browser to the URL to the location of the images.

7. The method of claim 1 wherein the visitor is a registered user of the network-based photosharing system and accesses the images using a second one of the peer nodes.

8. The method of claim 1 further comprising:
    associating with each image that is to be shared on the first peer node metadata describing the image;
    uploading the metadata associated with each image from the first peer node to a central server, while maintaining storage of the images on the first peer node;
    in response to the central server receiving search criteria based on the metadata submitted by a second peer node, returning a list of image locators for images matching the search criteria to the second peer node;
    dynamically generating on the second peer node an image album that contains at least a portion of the matching images; and
    allowing the visitor to select which images in the image album to print.

9. The method of claim 8 wherein dynamically generating the image album comprises: if one or more of the images to be incorporated into the image album are stored on the second peer node, then retrieving the images from the second peer node, and if one or more of the images to be incorporated into the image album are stored on other peer nodes, using the image locators to retrieve the images directly from the other peer nodes.

10. A peer-to-peer photosharing system, comprising:
    a plurality of peer nodes, wherein each node stores respective images, and each image has an associated set of metadata describing the image;
    a central server in communication with the peer nodes over a network, such that when images from each of the peer nodes are to be shared on the central server, the peer nodes upload the metadata for the respective images to the central server, while maintaining storage of the image data on the respective peer nodes, the central server further functioning to allow a user of one of the peer nodes to submit a search request based on the metadata, and in response, returns a list of image locators for images matching the search criteria; and
    application software on each of the peer nodes for:
        allowing a user of the peer node to invite at least one visitor to view images hosted on the peer node;
        displaying images to a visitor upon request;
        receiving a notification that the visitor has completed a print request form; and
        displaying to the user an indication of which images are to be printed, such that the user, rather than a third party vendor, may have prints made and delivered to the visitor without a fee.

11. The photosharing system of claim 10 wherein the print request form requires a name of the visitor, specifies which images to print, and specifies a quantity of prints.

12. The photosharing system of claim 10 wherein the print request form is in Digital Print Order Format (DPOF).

13. The photosharing system of claim 10 wherein the visitor is personally known by the user and is not required to supply personnel information.

14. The photosharing system of claim 10 wherein the visitor is invited by sending an email with a URL to a location of the images.

15. The photosharing system of claim 14 wherein the visitor accesses the images by directing a web browser to the URL to the location of the images.

16. The photosharing system of claim 10 wherein the visitor is a registered user of the photosharing system and accesses the images using another one of the peer nodes.

17. A method for requesting prints of digital images displayed online, the method comprising:
    allowing a user of a networked computer to invite at least one visitor to view images hosted on the networked computer;
    allowing the visitor to browse the images on the networked computer and to select one or more images to print by filling out a print request form that identifies the visitor and the selected images; and
    notifying the user, rather than a third party vendor, of the print request form, wherein the user, rather than the third party vendor, accesses the print request form, prints the selected images, and delivers the prints to the visitor.

18. A method for requesting prints of digital images displayed online, the method comprising:
    creating a network-based photosharing system comprising a plurality of peer nodes that contain images and that are capable of communicating with other peer nodes;
    allowing a user of a first peer node to invite at least one visitor to view images hosted on the first peer node;
    allowing the visitor to browse the images on the first peer node and to select one or more images to print by filling out a print request form that identifies the visitor and the selected images;
    notifying the user that the visitor has inserted information on the print request form, wherein the user, rather than a third party vendor, accesses the print request form, prints the selected images, and delivers the prints to the visitor;
    associating with each image that is to be shared on the first peer node with metadata describing the image;
    uploading the metadata associated with each image from the first peer node to a central server, while maintaining storage of the images on the first peer node;
    in response to the central server receiving search criteria based on the metadata submitted by a second peer node, returning a list of image locators for images matching the search criteria to the second peer node;
dynamically generating on the second peer node an image album that contains at least a portion of the matching images; and
allowing the visitor to select which images in the album to print.

* * * * *